US012251694B2

(12) United States Patent
Coffey et al.

(10) Patent No.: US 12,251,694 B2
(45) Date of Patent: Mar. 18, 2025

(54) LIQUID HANDLING DEVICE

(71) Applicant: South East Technological University, Waterford (IE)

(72) Inventors: Lee Coffey, Waterford (IE); Tríona Marie Dooley-Cullinane, Waterford (IE)

(73) Assignee: South East Technological University, Waterford (IE)

( * ) Notice: Subject to any disclaimer, the term of this patent is extended or adjusted under 35 U.S.C. 154(b) by 598 days.

(21) Appl. No.: 17/594,965

(22) PCT Filed: May 29, 2020

(86) PCT No.: PCT/EP2020/065080
§ 371 (c)(1),
(2) Date: Nov. 4, 2021

(87) PCT Pub. No.: WO2020/240021
PCT Pub. Date: Dec. 3, 2020

(65) Prior Publication Data

US 2022/0347671 A1 Nov. 3, 2022

(30) Foreign Application Priority Data

May 29, 2019 (GB) ..................................... 1907538

(51) Int. Cl.
*B01L 3/00* (2006.01)

(52) U.S. Cl.
CPC ......... *B01L 3/502* (2013.01); *B01L 2300/044* (2013.01); *B01L 2300/0672* (2013.01)

(58) Field of Classification Search
CPC ............... B01L 3/502; B01L 2300/044; B01L 2300/0672; B01L 2200/028;
(Continued)

(56) References Cited

U.S. PATENT DOCUMENTS

2005/0163660 A1 7/2005 Wang
2009/0100944 A1 4/2009 Newby
(Continued)

FOREIGN PATENT DOCUMENTS

CN 106053162 A 10/2016
WO 9103224 A1 3/1991
(Continued)

OTHER PUBLICATIONS

European Examination Report for EP Application No. P36346EPN1/PKL dated Jun. 5, 2024, 5 pages.
(Continued)

*Primary Examiner* — Christine T Mui
(74) *Attorney, Agent, or Firm* — Hoffman Warnick LLC

(57) ABSTRACT

Broadly speaking, embodiments of the present techniques provide a liquid handling device that enables a user to more easily and efficiently perform sample dilutions, without requiring the user to perform any calculations or be in a controlled environment (e.g. a laboratory or sterile/aseptic environment). Advantageously, this may enable a user to perform sample dilutions and subsequent sample processing outside of a laboratory, such as during field work, or in environments, regions or countries where access to sterile/aseptic environments may be difficult or nonexistent. The device may be used to dilute any liquid sample, such as biological samples, chemical samples, or environmental samples (e.g. liquid samples taken from a river or lake, or soil samples that are mixed with liquid).

20 Claims, 6 Drawing Sheets

(58) Field of Classification Search
CPC ....... B01L 2300/046; B01L 2300/0832; B01L 2400/0644
USPC .................................................. 422/547, 500
See application file for complete search history.

(56) References Cited

U.S. PATENT DOCUMENTS

| | | | | |
|---|---|---|---|---|
| 2010/0311165 | A1* | 12/2010 | Ram .................. | A61B 10/0038 435/307.1 |
| 2018/0272330 | A1 | 9/2018 | Lee et al. | |
| 2019/0025163 | A1 | 1/2019 | Carrano et al. | |

FOREIGN PATENT DOCUMENTS

| | | | |
|---|---|---|---|
| WO | 2009140502 | A1 | 11/2009 |
| WO | 2018130946 | A1 | 7/2018 |
| WO | 2018186823 | A1 | 10/2018 |

OTHER PUBLICATIONS

International Search Report for corresponding International Application No. PCT/EP2020/065080 dated Jul. 16, 2020, 4 pages.
GB Search Report for corresponding GB Application No. 1907538.1 dated Nov. 28, 2019, 3 pages.

* cited by examiner

LIQUID HANDLING DEVICE

The present techniques generally relate to apparatus for a device for performing liquid dilutions in a systematic manner.

Serial dilutions are typically required in biological and chemical processes. A dilution involves taking a known volume (e.g. 1 ml) of a stock solution and adding it to a known volume of a diluent (e.g. 9 ml, to produce a ten-fold dilution). The diluent may be any suitable liquid, such as distilled water or a buffer. The process can be repeated for successive dilutions (serial dilutions) by using a diluted solution from one dilution as the stock for the next dilution. At each stage, 1 ml of the previous dilution may be added to 9 ml of diluent, such that each stage results in a further ten-fold change (reduction) in concentration. This process can be laborious if a large change in concentration is required for subsequent processing/use.

Typically, samples which need to be kept under aseptic or sterile conditions need to be diluted in a laboratory setting. This requires access to aseptic/sterile conditions, the knowledge and skills to perform the dilutions, a sterile diluent, and laboratory equipment to facilitate the process.

Background information can be found in the following patent literature: WO2018/186823 which discloses a biological fluid dilution device having a moveable piston tube with a metering groove that can measure a precise volume of biological fluid; CN106053162 which discloses a solution preparing and measuring device having a liquid distribution barrel for preparing liquid and a liquid collection tube to measure the liquid; and US2019/025163 which discloses a specimen processing device that includes one or more vessels that are each coupled to a metering reservoir by a plurality of syphons configured to deliver a metered and equivalent volume of liquid to each vessel. However, these documents disclose devices that are complex from a mechanical point of view (e.g. have complex components to facilitate the flow of liquid), and complex from a manufacturing point of view (which increases the cost of the device and makes it less desirable). In many biology and chemistry laboratories, cheap, single-use devices and components are desirable, as these reduce the need to carefully clean, decontaminate and sterilise the devices and components for re-use. In contrast, these documents disclose devices that are complex and so are likely to be expensive and not suitable for single-use, and may not be easily used outside a laboratory setting (e.g. in the field/during field work).

The present applicant has identified the need for a device that enables easier dilutions without requiring a laboratory setting.

According to the present techniques, there is provided a hand-held liquid handling device for diluting a liquid sample, comprising: at least two chambers connected together and arranged to contain liquid; and at least one liquid transfer mechanism arranged to transfer a controlled volume of liquid from one chamber to an adjacent chamber. In some cases, a liquid transfer mechanism may be provided in a housing between adjacent chambers. In other cases, a liquid transfer mechanism may be provided in a housing of each chamber.

Preferred features are set out in the appended dependent claims.

Implementations of the present techniques will now be described, by way of example only, with reference to the accompanying drawings, in which:

FIG. 2 shows an exploded view of the individual components of the liquid handling device of FIG. 1;

Broadly speaking, embodiments of the present techniques provide a liquid handling device that enables a user to more easily and efficiently perform sample dilutions, without requiring the user to perform any calculations or be in a controlled environment (e.g. a laboratory or sterile/aseptic environment). Advantageously, this may enable a user to perform sample dilutions and subsequent sample processing outside of a laboratory, such as during field work, or in environments, regions or countries where access to sterile/aseptic environments may be difficult or non-existent. The device may be used to dilute any liquid sample, such as biological samples, chemical samples, or environmental samples (e.g. liquid samples taken from a river or lake, or soil samples that are mixed with liquid). Advantageously, the liquid handling device is mechanically-operated by a user, such that the device may be used even when no power source is available. Furthermore, the liquid handling device is a hand-held device, which means the device is compact and easy to transport and use for field work.

Figure 1:
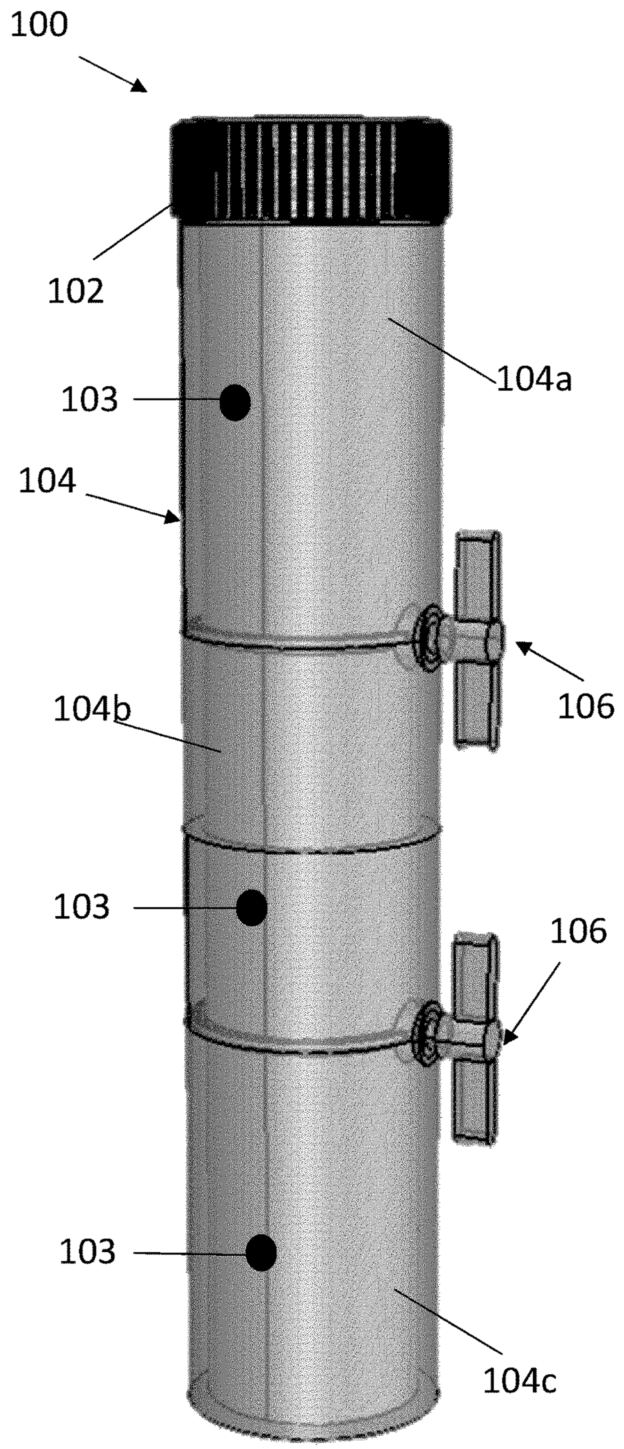
FIG. 1 shows a side view of an example liquid handling device.

FIG. 1 shows a side view of an example hand-held liquid handling device 100 for diluting a liquid sample. The liquid handling device 100 comprises: at least two chambers 104 connected together and arranged to contain liquid (not shown); and a liquid transfer mechanism 106 provided between adjacent chambers and arranged to transfer a controlled volume of liquid from one chamber to an adjacent chamber.

In the example shown in FIG. 1, the device 100 comprises three chambers 104*a*-*c*. Chambers 104*a* and 104*b* are adjacent to each other and are connected together, and chambers 104*b* and 104*c* are adjacent to each other and are connected together. This arrangement may enable two or three dilutions of a sample to be performed. For example, a stock solution may be provided in chamber 104*a*. Chambers 104*b* and 104*c* may contain a diluent. The liquid transfer mechanism 106 provided between chambers 104*a* and 104*b* may transfer a controlled volume of the stock solution in chamber 104*a* to the diluent in chamber 104*b*. For example, the liquid transfer mechanism 106 may transfer 1 ml of stock solution into 9 ml of diluent. As a result, chamber 104*b* contains a solution which is ten times less concentrated than the stock solution in chamber 104*a*. If further dilutions are required, the solution in chamber 104*b* becomes the new ‘stock solution’. Thus, the liquid transfer mechanism 106 provided between chambers 104*b* and 104*c* may transfer a controlled volume of the new stock solution in chamber 104*b* to the diluent of chamber 104*c*. For example, the liquid transfer mechanism 106 may transfer 1 ml of the solution in chamber 104*b* into 9 ml of diluent in chamber 104*c*. As a result, chamber 104*c* contains a solution which is ten times less concentrated than the stock solution in chamber 104*b*, and 100 times less concentrated than the (original) stock solution in chamber 104*a*. In other words, two dilution steps have taken place and the original stock solution may be an undiluted or a diluted solution. Alternatively, chamber 104*a* may contain only a diluent and a sample may be added to chamber 104*a* to provide a stock solution, i.e. a solution which is less concentrated than the original sample (e.g. ten times less concentrated using 1 ml of sample to 9 ml of diluent). The diluted sample solution in chamber 104*a* may then be diluted twice using chambers 104*b*, 104*c* more as explained above. It will be understood that the or each liquid transfer mechanism 106 may be able to transfer any predetermined volume of liquid from one chamber to another. Similarly, each chamber 104 may contain any volume of diluent as required for the specific dilution being performed.

Thus, the at least two chambers 104 of the device may comprise: a first chamber for holding a stock solution; and a second chamber for holding a diluent; wherein the liquid transfer mechanism is provided between the first chamber and the second chamber, and arranged to transfer a controlled volume of stock solution from the first chamber into the second chamber. Alternatively, the at least two chambers 104 of the device may comprise: a first chamber for holding a first diluent; and a second chamber for holding a second diluent. The first and second diluents may be the same or different.

The device 100 may be provided as a pre-formed device, such that the at least two chambers 104 are already connected together. In this case, the at least two chambers may be fixedly connected together, and a user may not be able to separate individual chambers 104 from the device without damaging the device 100. For example, the at least two chambers may be connected together by any or more of: heat sealing, an adhesive, and a UV-cured adhesive. It will be understood that this is a non-exhaustive list of example mechanisms for fixedly connecting together the chambers.

Alternatively, the device 100 may be provided as a kit comprising two or more chambers and one or more liquid transfer mechanisms, which a user may be able to assemble as they require. In this case, each chamber 104 may comprise at least one fastening mechanism for releasable connection of the chamber to at least one other chamber. The fastening mechanism may be or comprise a screw thread or clipping mechanism. This may enable a user to connect together as many chambers as they require, according to the number of serial dilutions they need to perform.

The device 100 may comprise at least one sample aperture 103 for adding liquid to the device or removing liquid from the device. The device 100 may comprise a single sample aperture 103 on the chamber corresponding to the final dilution in the series (which in the example of FIG. 1 is chamber 104*c*). This may enable some or all of the liquid in chamber 104*c* to be extracted for further processing/use. In such an arrangement, the chamber in which the original stock solution is provided may comprise a lid 102 to enable the stock solution to be added to the device 100. The lid 102 may be any one of: a screw cap, a flip-cap or a plug, a foil layer, aluminium foil, Polyvinyl chloride film, polyethylene wrap or a thermoplastic flexible plastic film. Additionally or alternatively, each chamber 104 may comprise a sample aperture 103 to enable liquid to be added to or extracted from the device 100 (i.e. from each chamber 104). The sample aperture 103 may enable liquid to be poured out of the chamber 104, or may enable liquid to be extracted from the chamber 104 using a pipette, for example. The sample aperture 103 may be of any suitable diameter to allow, for example, a pipette tip of a P2, P10, P100, P1000, P5000 or 10 ml serological pipette to enter.

To prevent contamination or liquid leakage, and ensure aseptic technique and the sterility of the samples within the chambers is maintained, the or each sample aperture 103 may comprise a seal (not shown) for covering the sample aperture. The seal may be a removable seal, such as a removable film. The seal may be resealable to allow repeated access to the sample aperture 103. The seal may be a pierceable seal. The sampling aperture 103 may be sealed using a film such as any one of the following: Polyvinyl chloride film, polyethylene wrap, cellophane, tape, acetate, or a thermoplastic flexible plastic film. Alternatively, the sampling aperture 103 may be sealed with a push-fit seal such as a bung, plug, stopper or cork, any of which may be formed from a suitable material such as hardened rubber, silicone, polypropylene or natural cork. It will be understood that these are non-limiting and non-exhaustive examples of seals for the sampling aperture 103. The seal may be broken by the end-user to allow a sample to be removed. When the seal is broken, the end-user should use aseptic technique or conduct the experiment in a biological safety cabinet if sterility is still required.

FIG. 2 shows an exploded view of the individual components of the liquid handling device 100 of FIG. 1.

Each chamber 104 of the at least two chambers may comprise at least one mating surface 208 which contacts a mating surface of an adjacent chamber. For example, mating surface 208 of chamber 104*a* contacts the mating surface of chamber 104*b* when the two chambers are connected together. The mating surface 108 of each chamber 104 may comprise a channel 206, and when two chambers are connected together the channel 206 of each mating surface forms a housing for the liquid transfer mechanism 106 that is located between adjacent chambers 104. The liquid transfer mechanism 106 may be insertable into the housing formed between adjacent chambers. Thus, in some cases, the or each liquid transfer mechanism 106 may be provided in the device 100 after the chambers 104 have been connected together.

The mating surface 208 of each chamber 104 comprises an aperture (not visible in FIG. 2) in the channel 206. The aperture is shown more clearly in FIGS. 3A and 3B.

The or each liquid transfer mechanism 106 of the device 100 may comprise: a rotatable container 202 provided between the at least two chambers 104; and a handle 210 extending outside of the device for rotating the rotatable container 202. The rotatable container 202 is provided within the housing formed between two chambers 104 when the mating surfaces of the two chambers come into contact. The rotatable container 202 is depicted as being substantially cylindrical, but it will be understood that the container 202 may have any suitable shape or form. The or each rotatable container comprises an aperture 204.

The rotatable mechanism 202 may be rotatable by a user of device 100 by operating the handle 210. The handle 210 may take any suitable form. rotatable mechanism 202 may be rotated between at least: a first position in which the aperture 204 of the rotatable container 202 aligns with the aperture in the channel 206 of a first chamber 104*a* (or 104*b*) of the two chambers; and a second position in which the aperture 204 of the rotatable container 202 aligns with the aperture in the channel 206 of a second chamber 104*b* (or 104*c*) of the two chambers. In the first position, liquid from the first chamber 104*a* (or 104*b*) fills the rotatable container 202, and in the second position, liquid from the rotatable container 202 is transferred to the second chamber 104*b* (or 104*c*). The rotatable mechanism 202 may also be rotated to a third position in which the aperture 204 of the rotatable container 202 is closed, i.e. is not aligned with any apertures whereby liquid flow is prevented. Preferably, the rotatable container is only able to rotate in one direction or by a predefined amount, so that liquid may only be transferred in one direction to perform the dilution. (In other words, it may not be possible for liquid to be transferred from chamber 104*c* to chamber 104*b*, or from chamber 104*b* to chamber 104*a*, as this would interfere with the dilution process). This controlled amount rotation may be achieved by the locking mechanism as described in more detail in relation to FIG. 3D.

It will be appreciated that the rotatable liquid transfer mechanism 106 is just one suitable form to ensure the correct transfer of liquid from one chamber to another chamber. The skilled person would understand that the liquid transfer mechanism 106 may take any suitable form, for example, a sliding mechanism or a button operated mechanism.

In embodiments where the first chamber 104*a* in the dilution device 100 to which the original stock sample/solution is added comprises a lid 102, then the chamber 104*a* may comprise a screw thread 200 to allow mating with complimentary threads in the lid 102. As explained above, the lid 102, if present, may take any form and this is merely one example.

The rotatable container 202 is hollow. The rotatable container 202 may be designed to have a specific volume so that a required, controlled volume of liquid is transferred from one chamber to the adjacent chamber in the device 100. For example, the rotatable container 202 may be able to hold exactly 1 ml of liquid. The skilled person would understand that the predetermined volume of liquid, and the volume of diluent in each chamber 104, depends on the required dilution factor.

The sealing unit 208 and the tap 106 may be formed from a suitable polymer, for example polycarbonate. The skilled person would understand that other polymers would be suitable, for example, polypropylene, polyethene, polybutylene terephthalate, polyester, polycarbonate or polysulfone.

Figure 3A:
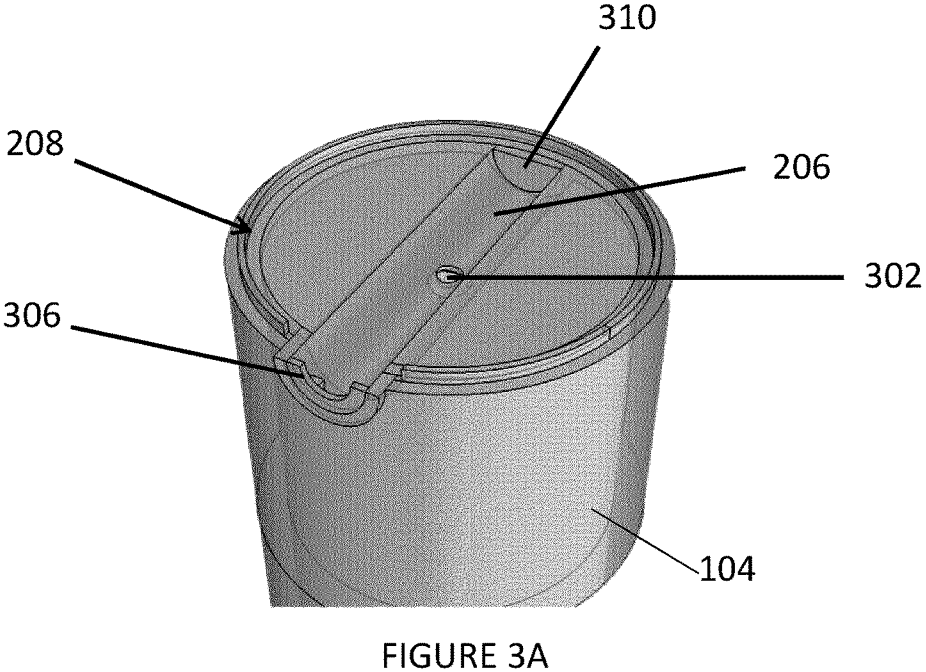
FIG. 3A shows a perspective view of a mating surface of a chamber of the liquid handling device.

FIG. 3A shows a perspective view of a mating surface 208 of a chamber 104 of the liquid handling device 100. As explained above, the mating surface 208 of each chamber 104 may comprise a channel 206. The mating surface 208 of each chamber 104 comprises an aperture 302 in the channel 206. The mating surface 208 may comprise an opening 306 to enable the liquid transfer mechanism 106 to be inserted into the housing formed between adjacent chambers. The mating surface may comprise an endstop 310, which may help position the liquid transfer mechanism 106 within the housing so that the aperture 204 of the liquid transfer mechanism aligns with the apertures 302 of the two mating surfaces 208.

Figure 3B:
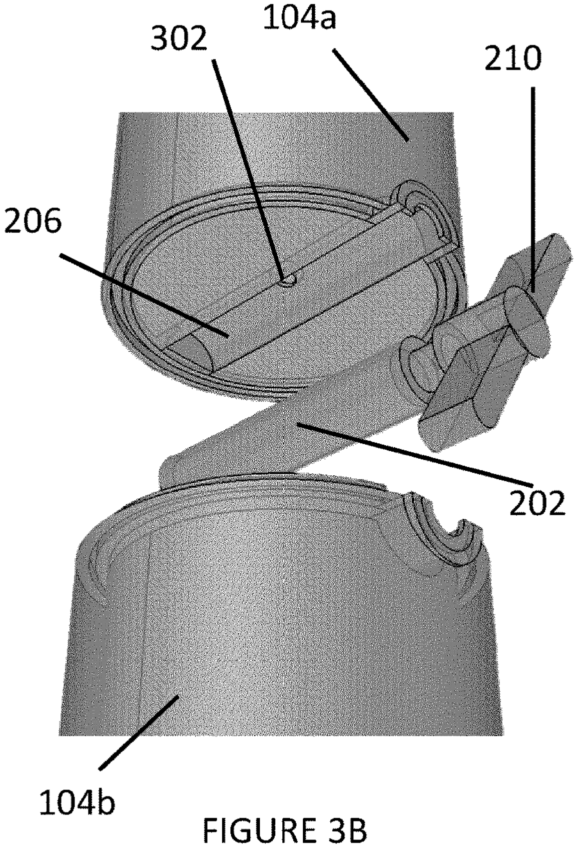
FIGS. 3B and 3C show, respectively, an exploded perspective view and an exploded side view of an example liquid transfer mechanism provided between adjacent chambers.
Figure 3C:
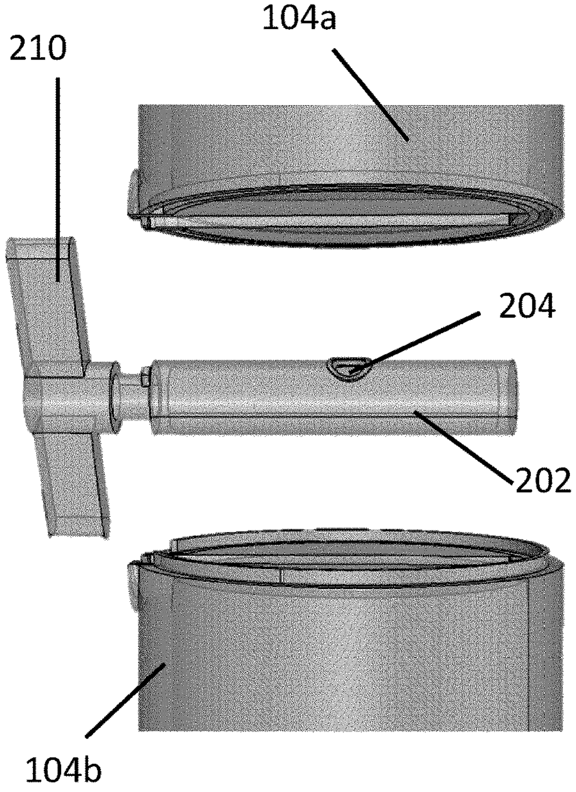

FIGS. 3B and 3C show, respectively, an exploded perspective view and an exploded side view of an example liquid transfer mechanism 106 provided between adjacent chambers 104*a*, 104*b*. When two chambers 104*a*, 104*b* are connected together the channel 206 of each mating surface forms a housing for the liquid transfer mechanism 106 that is located between the chambers. The liquid transfer mechanism 106 may be insertable into the housing formed between adjacent chambers. Thus, in some cases, the or each liquid transfer mechanism 106 may be provided in the device 100 after the chambers 104 have been connected together.

Figure 3D:
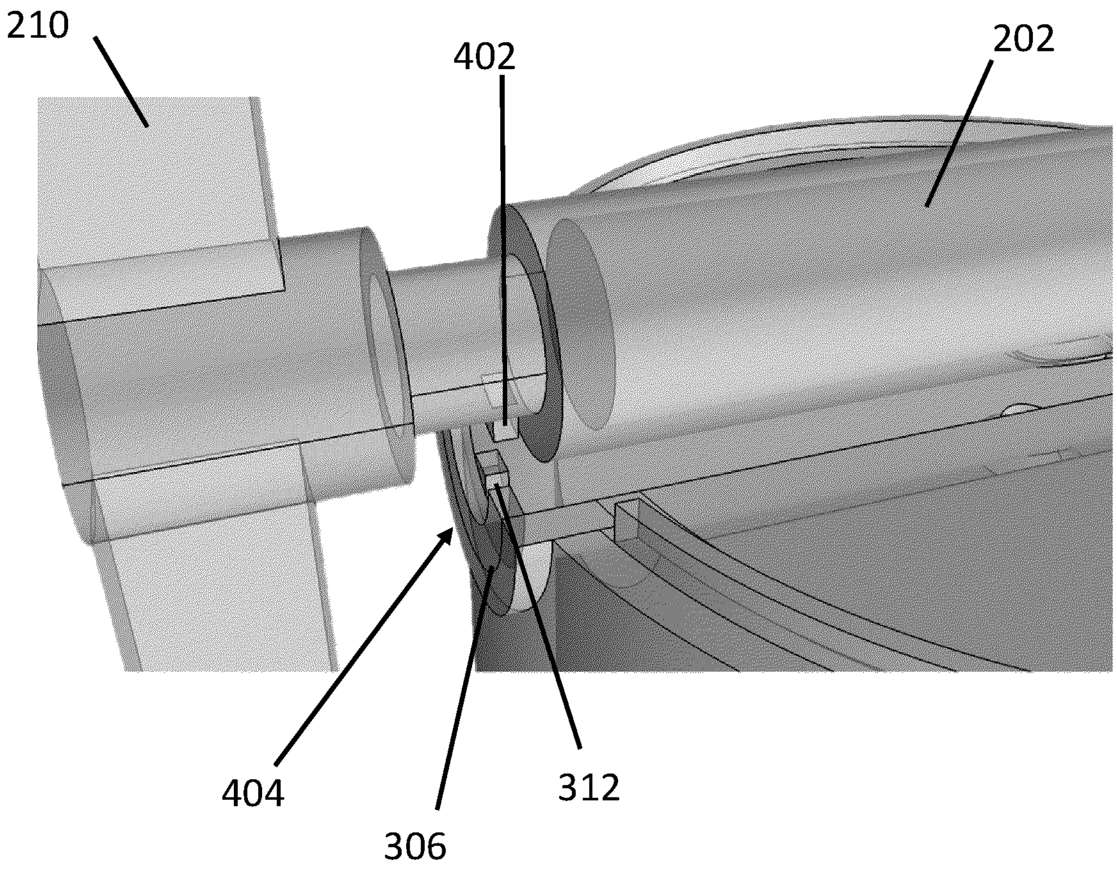
FIG. 3D shows a zoomed-in perspective view of an example locking mechanism of the liquid handling device.

FIG. 3D shows a zoomed-in perspective view of an example locking mechanism 404 of the liquid handling device 106. The locking mechanism 404 may prevent movement of the liquid transfer mechanism 106 after the controlled volume of liquid has been transferred from one chamber to the adjacent chamber. The locking mechanism 404 may comprise: an endstop 312 on at least one of the adjacent chambers; and a protrusion 402 on the liquid transfer mechanism 106, wherein interaction of the protrusion 402 with the endstop 404 prevents movement of the liquid transfer mechanism 106 after the liquid transfer has occurred. This may prevent the rotatable container 202 from rotating further and, for example, transferring more liquid and impacting the dilution process. The endstop 312 may be located on the opening 306 on the mating surface or elsewhere. The skilled person would understand that any suitable locking mechanism may be used to prevent the liquid transfer mechanism 106 from moving once the liquid transfer has taken place. For example, the locking mechanism may comprise an overhang or arm may engage with the protrusion 402 to prevent clockwise or anti-clockwise rotation.

When carrying out a serial dilution, it is important that the user is aware of exactly how much liquid is being transferred each time a dilution is carried out. Thus, if any sample was to leak out of the rotatable container 202 during rotation, the serial dilutions would not be accurate and may lead to experimental failures. To prevent leaking, an O-ring or similar seal may be provided around apertures 302, 204. The mating surfaces 208 and the liquid transfer mechanism 106 may be shaped such that the liquid transfer mechanism 106 sits tightly in the housing formed between the mating surfaces 208 which may reduce the likelihood of leaking and which may produce a leak-proof push-fit seal when appropriate materials are used. Alternatively, another suitable push-fit seal may be used.

Figure 4A:
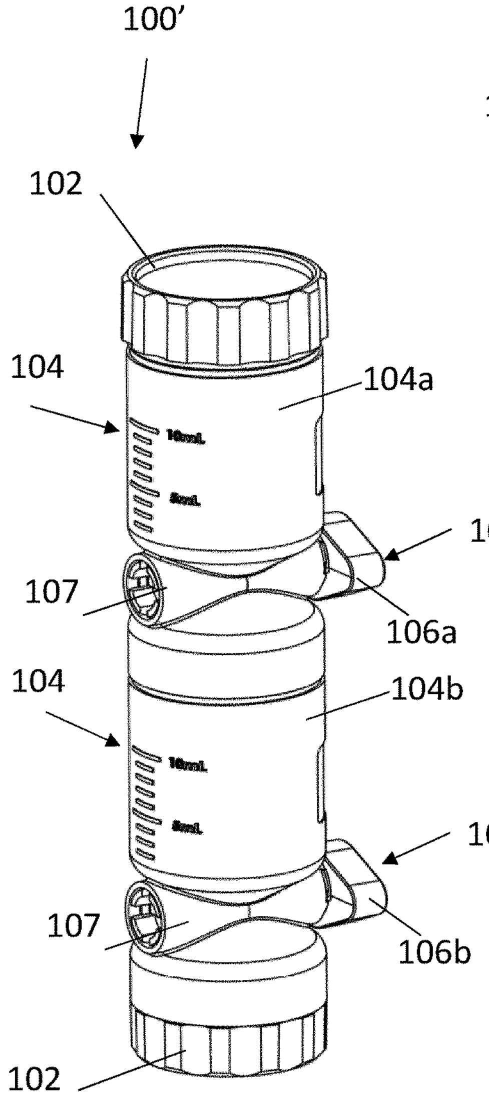
FIGS. 4A and 4B show, respectively, a perspective view and an exploded perspective view of a second example liquid handling device.
Figure 4B:
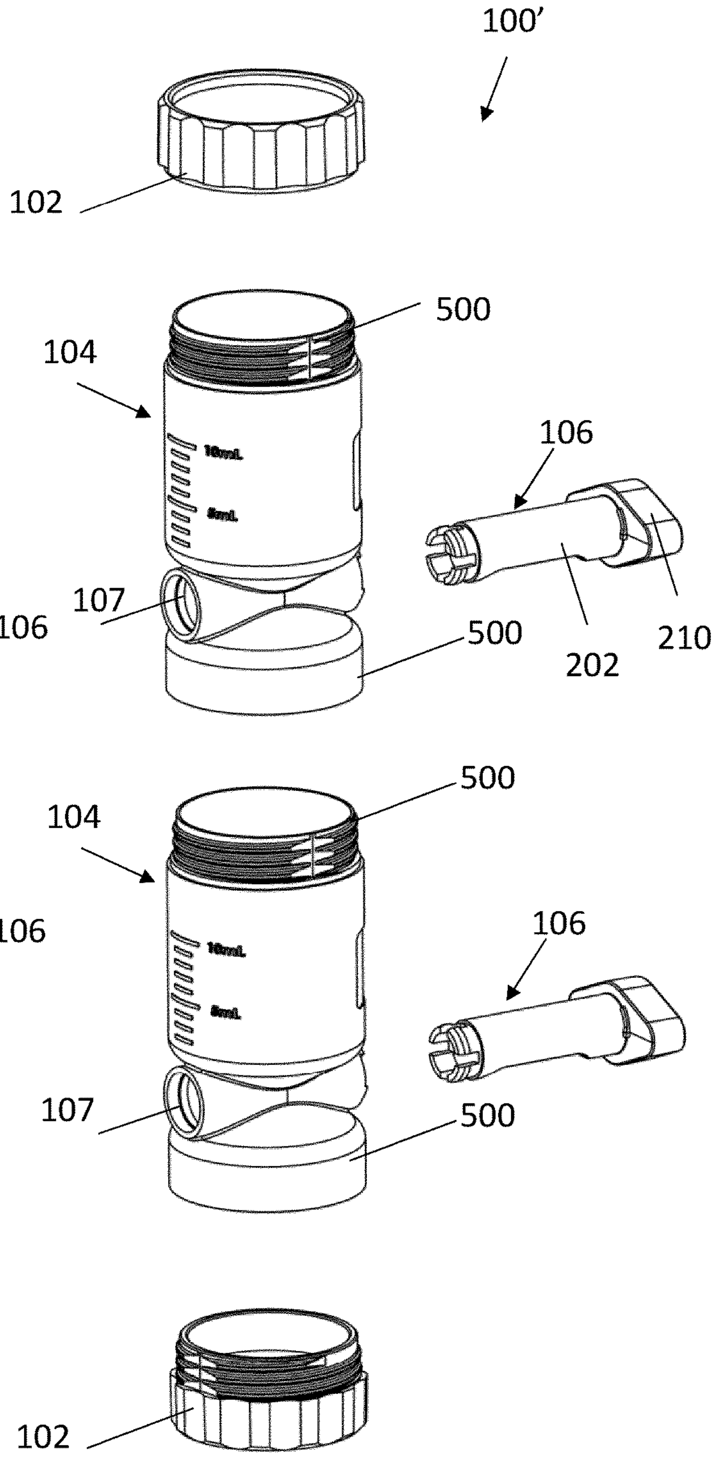

FIGS. 4A and 4B show, respectively, a perspective view and an exploded perspective view of a second example liquid handling device 100' for diluting a liquid sample. The liquid handling device 100' comprises: at least two chambers 104 connected together and arranged to contain liquid (not shown); and at least one liquid transfer mechanism 106 arranged to transfer a controlled volume of liquid from one chamber to an adjacent chamber. In this example, a liquid transfer mechanism 106 is provided in a housing within each chamber 104.

In FIG. 4A, the device 100' comprises two chambers 104*a* and 104*b*. Chambers 104*a* and 104*b* are adjacent to each other and are connected together. This arrangement may enable one or two dilutions of a sample to be performed, as explained above with respect to FIG. 1.

In contrast to the example of FIG. 1 where the liquid transfer mechanism is provided between adjacent chambers, in the example shown in FIG. 4A the liquid transfer mechanism 106 is located within a chamber 104. Thus, each chamber 104 of the device may comprise a housing 107 for a liquid transfer mechanism.

The at least one liquid transfer mechanism 106 of the device may comprise a first liquid transfer mechanism 106*a* and a second liquid transfer mechanism 106*b*. The at least two chambers 104 of the device may comprise: a first chamber 104*a* for holding a stock solution and a housing 107 for the first liquid transfer mechanism 106*a*; and a second chamber 104*b* for holding a diluent and a housing 107 for the second liquid transfer mechanism 106*b*; and wherein the first liquid transfer mechanism 106*a* is arranged to transfer a controlled volume of stock solution from the first chamber 104*a* into the second chamber 104*b*. Alternatively, the at least two chambers 104 of the device may comprise: a first chamber 104*a* for holding a first diluent; and a second chamber 104*b* for holding a second diluent. The first and second diluents may be the same or different.

The device 100' may be provided as a pre-formed device, such that the at least two chambers 104 are already connected together. In this case, the at least two chambers may be fixedly connected together, and a user may not be able to separate individual chambers 104 from the device without damaging the device 100'. For example, the at least two chambers may be connected together by any or more of: heat sealing, an adhesive, and a UV-cured adhesive. It will be understood that this is a non-exhaustive list of example mechanisms for fixedly connecting together the chambers.

Alternatively, the device 100' may be provided as a kit comprising two or more chambers and one or more liquid transfer mechanisms, which a user may be able to assemble as they require. In this case, each chamber 104 may comprise at least one fastening mechanism for releasable connection of the chamber to at least one other chamber. The fastening mechanism may be or comprise a screw thread (see e.g. FIG. 5A) or a clipping mechanism. This may enable a user to connect together as many chambers as they require, according to the number of serial dilutions they need to perform.

In an example, the kit provided to end users may comprise a plurality of chambers 104 and liquid transfer mechanisms 106. The liquid transfer mechanisms 106 may be provided as already assembled into the chambers 104, or may be provided separately for insertion by the end user—the former may be required if some or all of the chambers 104 in the kit are pre-filled with a diluent (such chambers may be referred to as a “regular” chamber). The kit may also comprise one or more lids 102. The kit may comprise a plurality of chambers 104 which are already coupled to a liquid transfer mechanism 106 and to a lid 102. If end users wish to add their own diluent to a chamber 104, some or all of the chambers 104 in the kit may not be pre-filled (such chambers may be referred to as a “starter” chamber). The lid 102 may be removed by the end user to enable them to add diluent to the chamber 104. A seal may be provided at one or both ends of the chamber 104, such that a seal covers one or both mating portions of the chamber 104 (i.e. the end that is mated to a lid or the end to be mated to another chamber 104). If some or all of the chambers 102 are pre-filled with diluent, the seal on the end of the chamber 104 that is mated to a lid 10 helps to keep the diluent liquid within the chamber 104 sterile even when the lid is removed.

For example, if an end user wishes to perform three serial dilutions, they would take one “starter” chamber and two “regular” chambers from the kit. They would remove the lids from the “regular” chambers and join the two regular chambers together by, for example, screwing/threading them together in such a way that the chambers are joined together, but the seals between the chambers have not yet been broken (which, as explained herein, may be achieved by further twisting/turning one chamber relative to another). The “starter” chamber is coupled to the first “regular” chamber, and again the seal between the “starter” chamber and the first “regular” chamber may not be broken at this stage. The lid of the “starter” chamber may not be removed until liquid is to be added to the “starter” chamber. This is because a seal may not be provided on the “starter” chamber below the lid, and therefore the lid needs to be retained on the chamber until the sample is added to prevent contamination.

Alternatively, all chambers—“starter” and “regular” chambers—may comprise a seal on both ends of the chamber regardless of whether they are pre-filled with liquid. This ensures that even if the lid is removed from a chamber, the contents of the chamber remain sterile and unexposed to the external environment due to the presence of the seal. In this case, a seal of the chamber may be broken either by mating the chamber to another chamber (as described herein), or by a scoring or cutting mechanism provided within each lid. The scoring or cutting mechanism within each lid may operate in the same way as the cutting mechanism of each chamber, i.e. screwing on a lid to a chamber secures the lid to the chamber, but turning the lid further to tighten the lid engages the cutting mechanism of the lid with the seal on the chamber.

Each chamber 104 of device 100' may comprise at least one sample aperture 103 for adding liquid to the device or removing liquid from the device, as described above with respect to FIG. 1. (The aperture 103 is not visible in FIGS. 4A and 4B, but is shown in FIG. 6B). The sample aperture 103 may enable liquid to be poured out of the chamber 104, or may enable liquid to be extracted from the chamber 104 using a pipette, for example. The sample aperture 103 may be of any suitable diameter to allow, for example, a pipette tip of a P2, P10, P100, P1000, P5000 or 10 ml serological pipette to enter.

Each chamber 104 may be couplable to a lid 102 and to another chamber 104. For example, the chamber in which the original stock solution is provided may comprise a lid 102 to enable the stock solution to be added to the device 100'. The lid 102 may be any one of: a screw cap, a flip-cap or a plug, a foil layer, aluminium foil, Polyvinyl chloride film, polyethylene wrap or a thermoplastic flexible plastic film.

To prevent contamination or liquid leakage, and ensure aseptic technique and the sterility of the samples within the chambers is maintained, the or each sample aperture 103 may comprise a seal (not shown) for covering the sample aperture. The seal may be a removable seal, such as a removable film. The seal may be resealable to allow repeated access to the sample aperture 103. The seal may be a pierceable seal. The sampling aperture 103 may be sealed using a film such as any one of the following: Polyvinyl chloride film, polyethylene wrap, cellophane, tape, acetate, or a thermoplastic flexible plastic film. Alternatively, the sampling aperture 103 may be sealed with a push-fit seal such as a bung, plug, stopper or cork, any of which may be formed from a suitable material such as hardened rubber, silicone, polypropylene or natural cork. It will be understood that these are non-limiting and non-exhaustive examples of seals for the sampling aperture 103. The seal may be broken by the end-user to allow a sample to be removed. When the seal is broken, the end-user should use aseptic technique or conduct the experiment in a biological safety cabinet if sterility is still required.

Each chamber 104 may comprise at least one mating portion 500. The mating portion 500 may be mated with/connected to a lid 102 or to the mating portion 500 of another chamber 104. The mating portion 500 may comprise a fastening mechanism for releasable connection to at least one other chamber (or to a lid). The at least one fastening mechanism of one chamber may be one of a thread or a groove, and is connectable to the other of a thread or a groove of another chamber. The fastening mechanism may comprise a screw mechanism to connect together two chambers (or a chamber to a lid), as visible in FIG. 4B and FIG. 5A.

The at least one mating portion 500 of each chamber 104 may comprise at least one seal (not shown) to keep the chamber 104 sterile/aseptic before use, and which must be removed in order for liquid to be transferred from one chamber to another. The seal may also prevent liquid in one chamber from flowing or moving into an adjacent chamber until the liquid transfer mechanism is activated/used. The seal may therefore comprise or be made of a non-permeable membrane layer. Each mating portion 500 of each chamber 104 may comprise a seal. Alternatively, each chamber 104 may comprise an open end and a sealed end. The open end of a chamber 104 may mate with the sealed end of another chamber 104. The sealed end/seal may be formed of a film layer which may be, for example, a layer of aluminium foil, Polyvinyl chloride film, polyethylene wrap or a thermoplastic flexible plastic film.

Figure 5A:
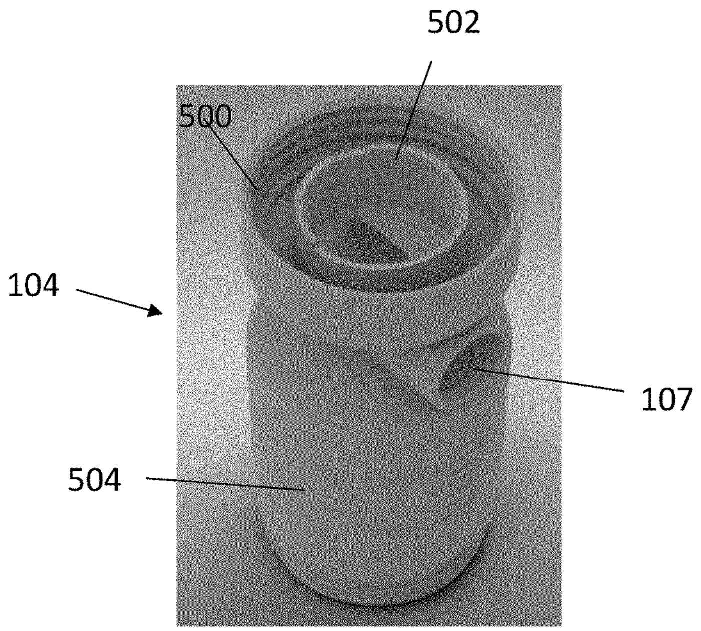
FIG. 5A shows a perspective view of a chamber of the second example liquid handling device.

FIG. 5A shows a perspective view of a chamber 104 of the second example liquid handling device 100'. The chamber 104 is presented upside down in order to show the mating portion 500, an example fastening mechanism (screw thread) and a cutting mechanism 502.

Figure 5B:
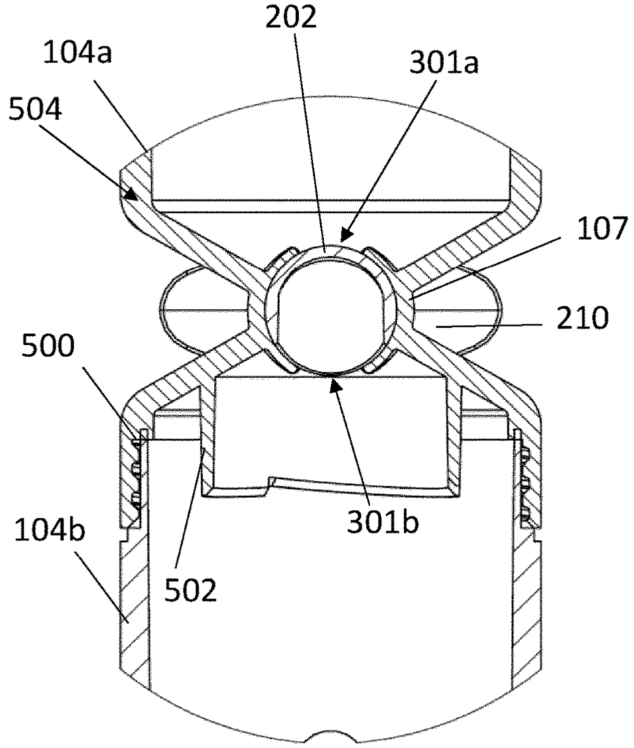
FIGS. 5B and 5C show, respectively, a side view and a perspective view of a cutting mechanism of the chamber of FIG. 5A.
Figure 5C:
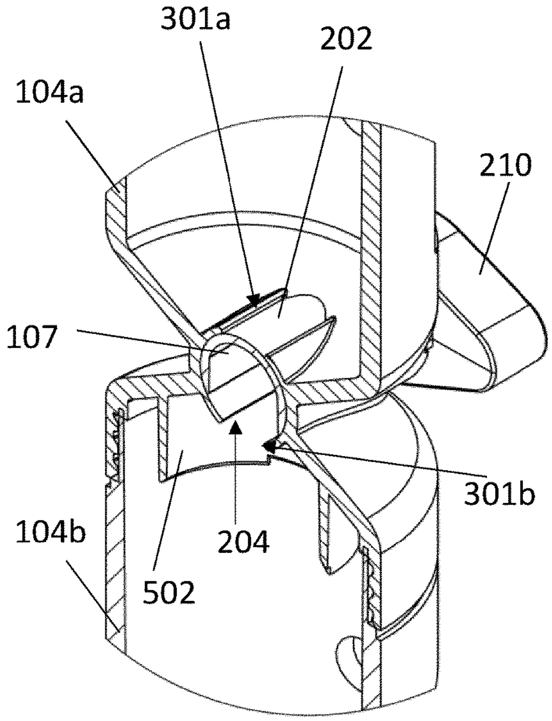

FIGS. 5B and 5C show, respectively, a cross-sectional side view and a cross-sectional perspective view of a cutting mechanism of the chamber of FIG. 5A. Specifically, two chambers 104*a* and 104*b* are coupled together, and FIGS. 5B and 5C show how the two chambers mate/couple together, which in this example is via a screw mechanism.

The mating portion 500 of each chamber 104 may comprise a cutting mechanism 502 for breaking the seal of an adjacent chamber when two chambers are connected together. That is, in order for a controlled volume of liquid from one chamber 104 to be transferred into an adjacent chamber 104, at least one seal may need to be broken. Breaking the seal may include semi-scoring or otherwise partially cutting through each seal so that liquid transfer between the chambers may occur but so that the seal is not detached entirely from its respective chamber. In this way, the seal remains at least partially attached to the chamber and is not free or loose therein. The cutting mechanism may comprise any one or more of: a sharp edge, a sharp tooth, multiple sharp teeth, a serrated edge, a piercing element, a piercing and cutting element, a slicing element, and a scoring element. The cutting mechanism may be part of the fastening mechanism.

The cutting mechanism may be activated by rotating one chamber relative to an adjacent chamber. For example, if two chambers 104 are connected by screwing the chambers together, twisting/turning one chamber relative to the other by some amount may screw the two chambers together, and twisting/turning one chamber by a further amount may activate the cutting mechanism. For example, twisting one chamber by a quarter or a half rotation may connect the two chambers together, and twisting one chamber by a further quarter or half rotation may cause the cutting mechanism of one or both chambers to engage with the seal therebetween. In this way, once two chambers are connected together, liquid can be moved from one chamber (via activation of the liquid transfer mechanism 106) into another without exposing the liquid to external contaminants.

Each liquid transfer mechanism 106 of the device 100' may comprise a rotatable container 202 in the housing of a chamber 104, and a handle 210, coupled to one end of the rotatable container 202, which extends outside of the device for rotating the rotatable container 202. The rotatable container 202 is depicted as being substantially cylindrical, but it will be understood that the container 202 may have any suitable shape or form. The or each rotatable container comprises an aperture 204 (see FIGS. 5C and 6A).

The rotatable container 202 may be rotatable by a user of device 100' by operating the handle 210. The handle 210 may take any suitable form. The rotatable container may be rotated between at least: a first position in which the aperture 204 of the rotatable container 202 aligns with a first aperture 301*a* in a first chamber 104*a* of the two chambers; and a second position in which the aperture 204 of the rotatable container 202 aligns with a second aperture 301*b* in the first chamber 104*a* of the two chambers; wherein in the first position, liquid from the first chamber 104*a* fills the rotatable container 202, and in the second position, liquid from the rotatable container 202 is transferred to the second chamber 104*b*. Each chamber 104 of device 100' may be considered to have a liquid containing portion 504 and a mating portion 500. The first aperture 301*a* of the chamber 104 may be within the liquid containing portion 504, and the second aperture 301*b* of the chamber 104 may be within one of the mating portions 500. The liquid transfer mechanism 106 may be provided in a housing 107 located between the liquid containing portion 504 and a mating portion 500 of each chamber 104. Thus, the rotatable container 202 transfers liquid from the liquid containing portion 504 to a mating portion 500. The mating portion 500 is connected to a liquid containing portion 504 of another chamber, and thus, liquid is transferred to this adjacent chamber.

The rotatable container 202 may also be rotated to a third position in which the aperture 204 of the rotatable container 202 is closed, i.e. is not aligned with any apertures whereby liquid flow is prevented. Preferably, the rotatable container is only able to rotate in one direction or by a predefined amount, so that liquid may only be transferred in one direction to perform the dilution. (In other words, it may not be possible for liquid to be transferred from chamber 104*b* to chamber 104*a*, as this would interfere with the dilution process). This controlled amount rotation may be achieved by the locking mechanism as shown in FIGS. 6A and 6B.

Figure 6A:
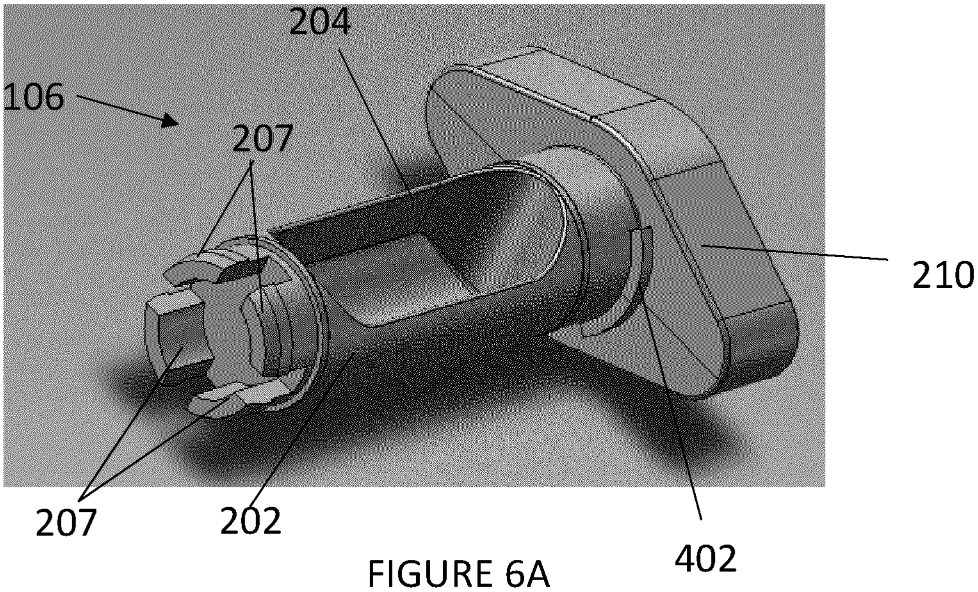
FIG. 6A shows a perspective view of a liquid transfer mechanism of the second example liquid handling device.
Figure 6B:
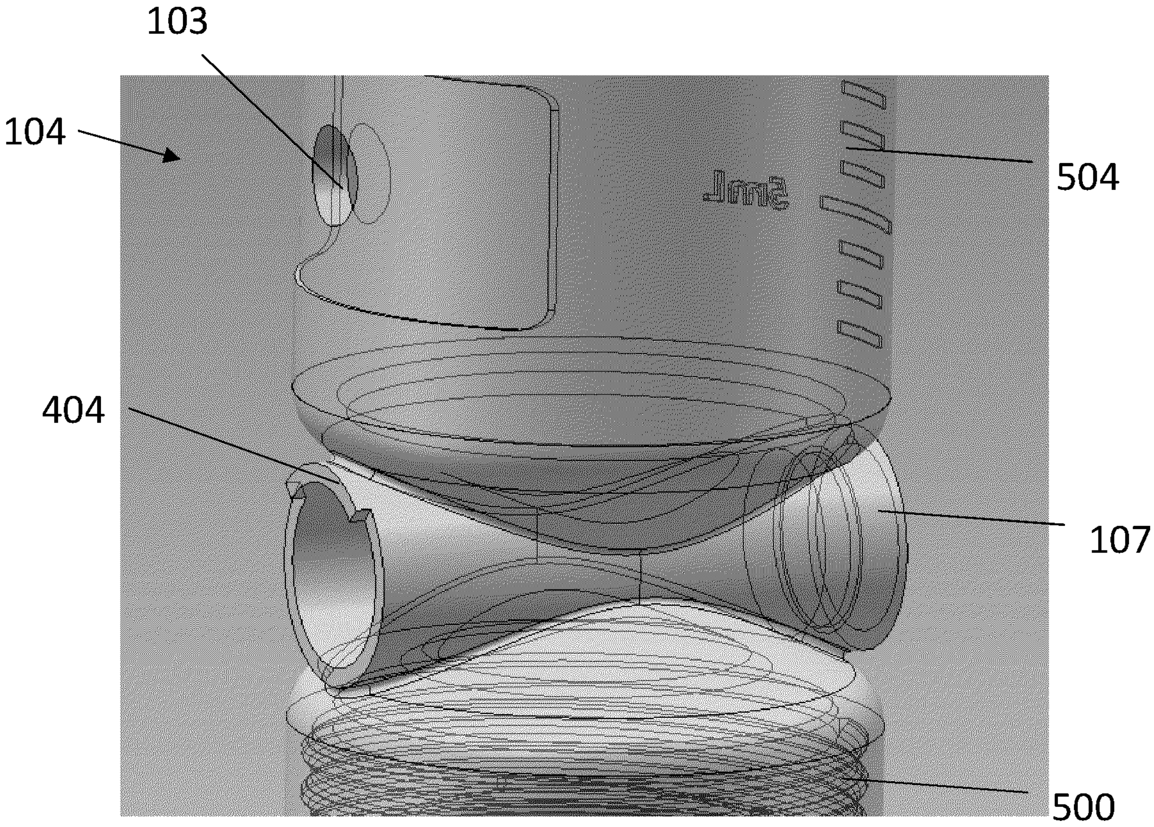
FIG. 6B shows a zoomed-in perspective view of a locking mechanism of the second example liquid handling device.

FIG. 6A shows a perspective view of a liquid transfer mechanism of the second example liquid handling device 100', and FIG. 6B shows a zoomed-in perspective view of a locking mechanism of the second example liquid handling device 100'.

The rotatable container 202 is hollow. The rotatable container 202 may be designed to have a specific volume so that a required, controlled volume of liquid is transferred from one chamber to the adjacent chamber in the device 100'. For example, the rotatable container 202 may be able to hold exactly 1 ml of liquid. The skilled person would understand that the predetermined volume of liquid, and the volume of diluent in each chamber 104, depends on the required dilution factor.

The locking mechanism may prevent movement of the liquid transfer mechanism 106 after the controlled volume of liquid has been transferred from one chamber to the adjacent chamber. The locking mechanism may comprise: an endstop 404 on the housing 107 of the chamber 104; and a protrusion 402 on the liquid transfer mechanism 106, wherein interaction of the protrusion 402 with the endstop 404 prevents movement of the liquid transfer mechanism 106 after the liquid transfer has occurred. This may prevent the rotatable container 202 from rotating further and, for example, transferring more liquid and impacting the dilution process. The skilled person would understand that any suitable locking mechanism may be used to prevent the liquid transfer mechanism 106 from moving once the liquid transfer has taken place. For example, the locking mechanism may comprise an overhang or arm that may engage with the protrusion 402 to prevent clockwise or anti-clockwise rotation.

As noted above, the liquid transfer mechanism 106 may comprise a handle 210 coupled to one end of the rotatable container 202. The liquid transfer mechanism 106 may further comprise a plurality of resiliently deformable fingers 207 disposed around another end (i.e. the opposite end to where the handle 210 is provided) of the rotatable container, wherein the fingers 207 hold the rotatable container 202 within the housing 107. The fingers 207 may be pushed towards each other when the liquid transfer mechanism 106 is inserted into housing 107, and the fingers 207 may expand or revert to their original expanded/open state once in the housing 107, thereby exerting a force on the housing 107 that retains the liquid transfer mechanism 106 in place. Other mechanisms may be provided in addition or alternatively to retain the liquid transfer mechanism 106 within the housing 107 of chamber 104. For example, each finger 207 may have a groove that engages with a lip or protrusion on an inner surface of housing 107, such that the engagement locks the liquid transfer mechanism 106 in place.

As mentioned above, the lid 102 of the device 100, 100' may comprise a cutting mechanism (not shown) for breaking the seal of the chamber to which the lid 102 is attached. Breaking the seal may be required if liquid is to be added to a chamber (e.g. to add a stock solution to the first chamber in the series). Breaking the seal may include semi-scoring or otherwise partially cutting through the seal. The cutting mechanism of the lid 102 may comprise any one or more of: a sharp edge, a sharp tooth, multiple sharp teeth, a serrated edge, a piercing element, a piercing and cutting element, a slicing element, and a scoring element. The cutting mechanism may be part of the fastening mechanism of the lid.

The cutting mechanism may be activated by rotating the lid relative to the chamber. For example, if a lid 102 is attached to a chamber 104 by screwing the lid onto the chamber, twisting/turning the lid relative to the chamber by some amount may screw the two together, and twisting/turning the lid by a further amount may activate the cutting mechanism. For example, twisting the lid by a quarter or a half rotation may connect the lid to the chamber, and twisting the lid by a further quarter or half rotation may cause the cutting mechanism of the lid to engage with the seal of the chamber.

The at least two chambers 104 of the devices 100 and 100' may be pre-filled with a diluent. The diluent may be a sterile diluent. The diluent may be, for example, sterile distilled water, or a Tris-HCl, sodium acetate, peptone buffer/phosphate buffer. The sterile diluent may be a liquid growth media, for example, a lysogeny broth (LB), Dulbecco's Modified Eagle Medium, minimal essential media, Dey-Engley Neutralizing Broth, or a phage buffer.

The device 100, 100' may be arranged to perform one or more dilutions according to a predetermined dilution factor, such as, for example, $10^{-1}$, $10^{-2}$, $10^{-3}$, $10^{-4}$, $10^{-4}$, $10^{-5}$, $10^{-6}$, $10^{-7}$, $10^{-8}$, $10^{-9}$, $5^{-1}$, $2^{-1}$, and $3^{-1}$. The predetermined volume of (sterile) diluent required for the dilution may be, for example, 1 ml, 5 ml, 10 ml, 15 ml, 20 ml, 25 ml, 30 ml, 40 ml, 50 ml, 100 ml.

The device 100, 100' may be able to dilute any type of liquid sample, such as, for example a biological sample, a chemical sample, and an environmental sample. Serial dilutions are often required in biology to accurately create highly diluted solutions as well as solutions for experiments. They may also be used to reduce the concentration of organisms or cells contained within a sample. In such cases, aseptic technique is required to prevent contamination of a sample. The liquid handling device 100, 100' may be used for the serial dilution of an input sample, under aseptic conditions.

The liquid handling device 100, 100' may be used for diluting biological samples, such as bacteria or mammalian cell cultures, where aseptic technique is crucial to experimental success. Therefore, the components of the liquid handling device 100, 100' may be formed from a non-reactive material. The device 100, 100' may be formed from a polymer or plastic. For example, the device 100, 100' may be formed of polypropylene, which has resistance to temperatures up to 135° C. and may be auto-claved, meaning the inner cavity of the liquid handling device 100, 100' should remain sterile. The components of the liquid handling device 100, 100' may be formed from any one of: polypropylene, polyethene, polybutylene terephthalate, polyester, polycarbonate and polysulfone.

The device 100, 100' may be a single-use device. Alternatively, it may be possible to sterilise the device 100, 100' for reuse.

Each component of the liquid handling device 100, 100' may be manufactured via injection moulding.

As previously described, serial dilutions are important in microbiology and cell culturing. They may be required to reduce the concentration of organisms or cells contained within a sample. In this situation it may be important to reduce the chance of contaminating the cultured sample when transferring an aliquot to the liquid handling device 100, 100'. Thus, the end-user may use the liquid handling device 100, 100' as a receptacle for culturing a sample. Alternatively, the chamber in which the original stock solution is added (e.g. chamber 104*a* in FIGS. 1 and 4A) may be empty, and a user may add an undiluted aliquot of their sample to this chamber 104*a*. The chamber 104*a* may then be used as a culturing chamber, such that the sample may be subsequently diluted in the same device.

The predetermined volume of sterile diluent may be added during manufacture of the liquid handling device 100, 100'.

The predetermined volume of sterile diluent may be added following assembly of the liquid handling device 100, 100', via the sampling port 103. The sampling port 103 may then be sealed and the liquid handling device 100, 100' may be sterilised before being shipped to an end-user. The skilled person would understand that any suitable method for sterilisation could be used, for example, electron beam or gamma irradiation, steam autoclaving at a suitable temperature or Ethylene Oxide gas.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A hand-held liquid handling device for diluting a liquid sample, the device comprising:

two chambers connected together and arranged to contain liquid, wherein the two chambers include a housing for a liquid transfer mechanism; and a first liquid transfer mechanism arranged to transfer a predetermined volume of liquid from one chamber to an adjacent chamber, the first liquid transfer mechanism including:

a rotatable container having a predetermined volume, wherein the rotatable container is insertable into the housing;

a handle, coupled to one end of the rotatable container, extending outside of the device for rotating the rotatable container;

a plurality of resiliently deformable fingers disposed around another end of the rotatable container to hold the rotatable container within the housing; and a locking mechanism for preventing movement of the rotatable container in the housing after the predetermined volume of liquid has been transferred from one chamber to the adjacent chamber.

2. The device as claimed in claim 1, further comprising a second liquid transfer mechanism;

wherein the two chambers comprise:

a first chamber for holding the liquid, and the housing includes a first housing for the first liquid transfer mechanism; and a second chamber for holding a diluent and the housing includes a second housing for the second liquid transfer mechanism; and wherein the first liquid transfer mechanism is arranged to transfer the predetermined volume of the liquid from the first chamber into the second chamber.

3. The device as claimed in claim 1, wherein the two chambers are adjacent chambers of a plurality of chambers, and the first liquid transfer mechanism is provided between the two chambers.

4. The device as claimed in claim 3, wherein the two chambers comprise:

a first chamber for holding a stock solution; and a second chamber for holding a diluent;

wherein the first liquid transfer mechanism is provided between the first chamber and the second chamber, and arranged to transfer the predetermined volume of the fluid from the first chamber into the second chamber.

5. The device as claimed in claim 1, wherein the two chambers are fixedly connected together by any one or more of: heat sealing, an adhesive, and a UV-cured adhesive.

6. The device as claimed in claim 1, wherein the two chambers are releasably connected together.

7. The device as claimed in claim 6, wherein:

each chamber of the two chambers comprises a mating portion, and the mating portion comprises a fastening mechanism for releasable connection to a corresponding mating portion of the other chamber; and the fastening mechanism of one chamber is one of a thread or a groove, and the fastening mechanism of the other of the two chambers is the other of the thread or the groove, and the fastening mechanism of each chamber is connectable to the other.

8. The device as claimed in claim 7, wherein the mating portion of each chamber comprises a seal;

wherein the seal comprises a non-permeable membrane layer.

9. The device as claimed in claim 8, wherein the mating portion of each chamber comprises a cutting mechanism for breaking the seal of the other chamber, wherein the cutting mechanism comprises any one or more of: a sharp edge, a sharp tooth, multiple sharp teeth, a serrated edge, a piercing element, a piercing and cutting element, a slicing element, and a scoring element; or wherein the cutting mechanism is part of the fastening mechanism; or wherein the cutting mechanism is activated by rotating one chamber relative to an adjacent chamber.

10. The device as claimed in claim 3, wherein each chamber of the at least two chambers comprises a mating surface adapted to contact a mating surface of the other chamber;

wherein the mating surface of each chamber comprises a channel, and the channel of each mating surface forms the housing for the first liquid transfer mechanism; and wherein the mating surface of each chamber comprises an aperture in the channel; or wherein the first liquid transfer mechanism is insertable into the housing formed between the two chambers.

11. The device as claimed in claim 1, wherein each chamber of the two chambers comprises a mating surface adapted to contact a mating surface of the other chamber, and the mating surface of each chamber comprises a channel and an aperture in the channel, wherein the rotatable container comprises an aperture, and wherein the rotatable container is rotatable between:

a first position in which the aperture of the rotatable container aligns with the aperture in the channel of a first chamber of the two chambers; and a second position in which the aperture of the rotatable container aligns with the aperture in the channel of a second chamber of the two chambers, wherein in the first position, the predetermined volume of liquid from the first chamber fills the rotatable container, and in the second position, the predetermined volume of liquid from the rotatable container is transferred to the second chamber.

12. The device as claimed in claim 1, wherein the rotatable container comprises an aperture and the rotatable container is rotatable between:

a first position in which the aperture of the rotatable container aligns with a first aperture in a first chamber of the two chambers; and a second position in which the aperture of the rotatable container aligns with a second aperture in the first chamber;

wherein in the first position, the predetermined volume of liquid from the first chamber fills the rotatable container, and in the second position, the predetermined volume of liquid from the rotatable container is transferred to a second chamber of the two chambers.

13. The device as claimed in claim 11, wherein the rotatable container is further rotatable between the first position, the second position, and a third position in which the aperture of the rotatable container is closed.

14. The device as claimed in claim 1, wherein the locking mechanism comprises:

an endstop on a chamber of the two chambers; and a protrusion on the first liquid transfer mechanism, wherein interaction of the protrusion with the endstop prevents movement of the first liquid transfer mechanism.

15. The device as claimed in claim 1, further comprising a sample aperture on each chamber of the two chambers, for adding liquid to the respective chamber or removing liquid from the respective chamber.

16. The device as claimed in claim 7, further comprising a lid couplable to the fastening mechanism of a mating portion of one of the two chambers;

wherein the lid comprises a cutting mechanism for breaking the seal of one chamber when the lid is coupled to the chamber; and wherein the cutting mechanism comprises any one or more of: a sharp edge, a sharp tooth, multiple sharp teeth, a serrated edge, a piercing element, a piercing and cutting element, a slicing element, and a scoring element.

17. The device as claimed in claim 1 wherein the two chambers are pre-filled with a diluent; and wherein a portion of the device is formed from a non-reactive material; or wherein a portion of the device is formed from a polymer or plastic; or wherein the device is arranged to perform a dilution according to a predetermined dilution factor; or wherein the liquid sample is any one of: a biological sample, a chemical sample, and an environmental sample; or wherein the device is a single-use device.

18. The device as claimed in claim 1, further comprising:

a sample aperture for adding liquid to a chamber of the two chambers, or for removing liquid from a chamber of the two chambers; and a removable and re-sealable seal for covering the sample aperture.

19. The device as claimed in claim 6, wherein each chamber of the two chambers comprises a mating portion, and the mating portion comprises a fastening mechanism for releasable connection to a corresponding mating portion of the other chamber, wherein the fastening mechanism comprises a screw mechanism to connect together two chambers.

20. A kit for diluting a liquid sample, the kit comprising:

two chambers connectable to one another and arranged to contain liquid; and a plurality of liquid transfer mechanisms each within a housing of a respective chamber of the two chambers, wherein each liquid transfer mechanism is arranged to transfer a different predetermined volume of liquid from one chamber to the other chamber of the two chambers, and wherein each liquid transfer mechanism includes:

a rotatable container having a predetermined volume, wherein the rotatable container is insertable into the respective housing;

a handle, coupled to one end of the rotatable container, extending outside of a device for rotating the rotatable container;

a plurality of resiliently deformable fingers disposed around another end of the rotatable container to hold the rotatable container within the respective housing; and a locking mechanism for limiting movement of the rotatable container in the respective housing after the predetermined volume of liquid has been transferred from one chamber to the other chamber.

* * * * *